US007023000B2

(12) United States Patent
Zyuzin

(10) Patent No.: US 7,023,000 B2
(45) Date of Patent: Apr. 4, 2006

(54) ISOTOPE GENERATOR

(75) Inventor: Alexander Zyuzin, Vancouver (CA)

(73) Assignee: Triumf, Vancouver (CA)

( * ) Notice: Subject to any disclaimer, the term of this patent is extended or adjusted under 35 U.S.C. 154(b) by 178 days.

(21) Appl. No.: 10/790,028

(22) Filed: Mar. 2, 2004

(65) Prior Publication Data

US 2006/0022127 A1 Feb. 2, 2006

Related U.S. Application Data

(60) Provisional application No. 60/472,118, filed on May 21, 2003.

(51) Int. Cl.
*G01N 21/01* (2006.01)

(52) U.S. Cl. ............................ 250/432 PD; 250/496.1; 250/493.1; 250/432 R

(58) Field of Classification Search .......... 250/432 PD
See application file for complete search history.

(56) References Cited

U.S. PATENT DOCUMENTS

| | | | |
|---|---|---|---|
| 3,966,547 | A | 6/1976 | Blue |
| 4,248,730 | A | 2/1981 | Mirzadeh et al. |
| 4,333,911 | A | 6/1982 | Comar et al. |
| 5,154,897 | A | 10/1992 | Ehrhardt et al. |

FOREIGN PATENT DOCUMENTS

| | | |
|---|---|---|
| JP | 54-065163 | 11/1977 |
| JP | 61-153127 | 7/1986 |

OTHER PUBLICATIONS

Yants, V. E.; Zyuzin, A. Y.; and Zhuikov, B. L., "Linear Sources of Ge-68", Institute for Nuclear Research, Moscow, Russia, pp. 17-18.
Robinson Jr., G. D., "Generator Systems for Positron Emitters", Positron Emission Tomography, 1985, pp. 81-101.
Gleason, G. I., "A Position Cow", Int'l Journal of Applied Radiation and Isotopes, 1960, vol. 8, pp. 90-94.
PCT International Search Report in PCT Appl. No. PCT/CA2004/000748 dated Sep. 2, 2004.

*Primary Examiner*—Nikita Wells
*Assistant Examiner*—James J. Leybourne
(74) *Attorney, Agent, or Firm*—Harness, Dickey & Pierce, P.L.C.

(57) ABSTRACT

Disclosed are a method and an apparatus for generating and collecting a secondary compound that includes daughter isotope, such as $^{68}$Ga, resulting from the decay of a parent isotope, such as $^{68}$Ge, present in a precursor compound. The apparatus includes a generator system comprising a collector vessel, a cold trap and a pump, that are operatively connected to sources for introducing a precursor compound and an eluant solution, and optionally purging gases and oxygen scavengers, into the generator system. In a generation mode a substantial portion of the precursor compound is maintained in or flows through the collector vessel while in recovery mode substantially all of the precursor compound is confined in the cold trap while the collector vessel is flushed with an eluant to remove the collected secondary compound.

25 Claims, 4 Drawing Sheets

ISOTOPE GENERATOR

This application claims the benefit of Provisional Application 60/472,118, filed May 21, 2003.

BACKGROUND OF THE INVENTION

1. Field of the Invention

The present invention is directed to methods and equipment for the generation of radioisotopes, particularly the generation of short-lived secondary radioisotopes (also referred to as daughter isotopes) from a gaseous precursor compound including a longer-lived radioisotope, and more particularly for the generation of a $^{68}$Ga compound from a $^{68}$Ge compound.

2. Description of the Related Art

Radioisotopes are widely used in modern medicine, with perhaps as many as one in every three people treated in a hospital benefiting from the use of a radioisotope through laboratory tests, imaging or treatment. One of the most widely used imaging techniques is Positron Emission Tomography (PET) which relies on positrons generated during the beta decay mode of certain isotopes. When these positively charged positrons combine with a negatively charged electron, the particles are annihilated and emit a pair of gamma rays (also referred to as annihilation radiation) having an energy of 511 keV and traveling in opposite directions.

A PET scanner uses a ring of detectors surrounding a patient who has received a dose of a radioisotope that are able to detect the gamma rays generated by the positron annihilation. Relying on the physics of annihilation radiation, the timing of the detection of the paired gamma rays allows the calculation of their point of origin and can be used to generate computer-assisted image reflecting the frequency and location of the annihilation events activity within the patient.

A number of radioisotopes are used in PET imaging including gallium-68, strontium-82, rubidium-82, fluorine-18, oxygen-15, nitrogen-13 and carbon-11. Some of these isotopes can be generated in sufficient quantities using smaller cyclotrons available to the private sector. Radioisotopes used in imaging work best when a significant fraction of the radioisotope dose is associated with the targeted tissue such as the brain, liver, or tumor. Rubidium-82, for example, is widely used in cardiac imaging because it is a chemical analog to potassium and will, therefore, tend to accumulate in muscle tissue. Rubidium-82 administered to a patient will tend to be present in the heart and, as it decays, will generate the gamma rays used to produce a PET image.

The radioisotopes preferred for PET imaging tend to have a relatively short half-life. The half-life of rubidium-82, for example, is only about 76 seconds. While a short half-life ensures that the radioisotope does not persist within a patient's body, it poses a storage problem as is must be produced only shortly before being administered to a patient. To overcome this problem, a range of radioisotope generators has been developed to produce sufficient quantities of the desired radioisotope from longer-lived precursor isotopes almost on demand.

For example, an exemplary rubidium-82 generator utilizes the strontium-82 as the parent isotope to produce rubidium-82 via beta decay. Strontium-82, which can be readily produced using an accelerator, has a half-life of 25.5 days. The strontium-82 can be loaded in the generator as a solution onto a chromatographic column composed of a resin or other suitable material under conditions that will tend retain both the strontium- 82 and the rubidium-82 generated as the strontium decays. The rubidium-82 is then selectively eluted from the column while leaving the strontium-82 behind, typically through the use of specific eluents. Because the strontium-82 is continually decaying and producing rubidium-82, the generator can be periodically flushed with an appropriate eluent to obtain the rubidium-82 as needed.

Like strontium, germanium-68 (written alternatively as Ge-68 or $^{68}$Ge) has relatively long half-life of 271 days and decays through electron capture to form gallium-68 (written alternatively as Ga-68 or $^{68}$Ga). Gallium-68, in turn, has a half life of about 68 minutes and decays primarily by positron emission to form a stable isotope, Zinc-68, making Ga-68 particularly useful for PET imaging applications. An early $^{68}$Ge/68Ga generator developed by Gleason in the 1960's utilized an alumina column as the adsorbant from which the Ga-68 was subsequently recovered by eluting the column with a dilute EDTA solution to form a Ga-68 chelate.

A variety of solvent extraction or column-based Ga-68 generators were developed during the 1960's with some versions becoming commercially available during the 1970's and 1980's. The solvent extraction techniques, however, tended to involve a rather complex chemical separation of the desired Ga-68 and tended to be subject to significant breakthrough of Ge-68 in the desired Ga-68 product. In addition, because of a long half-life of the precursor and because Ge-68 is an Auger electron emitter (emitting on the order of 20 low energy electrons per decay), the adsorbants used to retain the Ge-68 within the generators tended to deteriorate rapidly, further increasing the level of Ge-68 breakthrough in the desired Ga-68 product.

BRIEF SUMMARY OF THE INVENTION

The present invention relates to both a method and an apparatus for the generation of short-lived radioisotopes from a gas phase compound including a precursor isotope. An exemplary method for generating a secondary isotope from a precursor isotope includes introducing a precursor charge into a generator system, maintaining the precursor charge within the generator system for a period sufficient for a quantity of the precursor compound to decay and produce a desired quantity of a secondary compound including the secondary isotope, collecting the secondary compound on a collection surface, trapping substantially all of the precursor compound in a cold trap, eluating the collection surface to form an eluate containing substantially all of the secondary compound, and removing the eluate from the generator system.

In addition to the precursor charge, the generator system may include an oxygen scavenger and/or an inert diluent, such as helium, and/or include means for injecting one or more purge gases for the purpose of drying and/or flushing the generator system. The eluant may be a solution including one or more acids, such as hydrochloric acid, and/or chelating agents selected to remove substantially all of the secondary compound from the eluted surfaces in a directly useable, or preferably at least easily purified, form.

In particular, the disclosed method and apparatus are suitable for the production of a $^{68}$Ga product from a $^{68}$Ge precursor compound that includes $^{68}$Ge labeled $GeH_4$, preferably in combination with at least a minor portion of $SiH_4$ whereby the silane will act as an oxygen scavenger to reduce the $^{68}$Ge breakthrough in the product. Silane is particularly useful in such a generating method because it can be captured and maintained in a cold trap under substantially the same conditions required for capturing the germane precursor (e.g., through application of $LN_2$ to cool the cold trap). Once the $^{68}Ga$ product has been removed from the collection surfaces, the precursor and oxygen scavenger compounds may be released from the cold trap and thereby recharge the system, thus conserving substantially all of the unconverted charge and improving the efficiency of the generation process.

Certain exemplary embodiments of apparatus suitable for practicing the method of generating the secondary compounds as described herein are illustrated in FIGS. 1–4. These exemplary embodiments represent some of the basic arrangements of the operative elements useful for practicing the method including one or more collection vessels, one or more cold traps, and vessels configured for use as both collection vessels and cold traps, connected in various configurations to precursor, purge gas, eluate, scavenger and $LN_2$ supplies.

BRIEF DESCRIPTION OF THE DRAWINGS

The accompanying drawings are intended to depict exemplary embodiments of the invention to aid those of ordinary skill in the art in understanding the present invention and should not be interpreted in such as manner as to limit the scope of the present invention solely to the illustrated embodiments. Similarly, the accompanying drawings are not, unless explicitly noted, drawn to scale and should not be interpreted in a manner that limits the size, spacing or relative dimensions of the illustrated mechanical elements.

These figures are provided for illustrative purposes only and are not, therefore, drawn to scale. Indeed, the shape, organization, sizing and spatial relationships of the various components illustrated may have been reduced or enlarged to improve clarity. Similarly, those of ordinary skill in the art will appreciate that a wide variety of configurations of the basic components, as well as a variety of ancillary equipment and structural elements, may be incorporated in an apparatus fully capable of operating according to the described method.

DETAILED DESCRIPTION OF EXEMPLARY EMBODIMENTS

As mentioned above, the present invention utilizes a gaseous precursor. The idea for a new Ga-68 generator is based on the convenience of using the gaseous precursor $GeH_4$ (also referred to as germane, germanium hydride, germanium tetrahydride and monogermane). Germane is a relatively stable gas that is somewhat analogous to methane. Germane has a melting point of about −165° C., a boiling point of about −88° C., a thermal decomposition temperature of about 300° C. and can be stored for long periods without requiring unusual equipment or complicated processes. Methods for producing both Ge-68 and $^{68}GeH_4$ are described in an article by V. K. Yants et al. entitled Linear Sources of Ge-68, which was published in the Proceedings of the $6^{th}$ Workshop on Targetry and Target Chemistry, 1995, which is incorporated herein in its entirety by reference.

Figure 1:
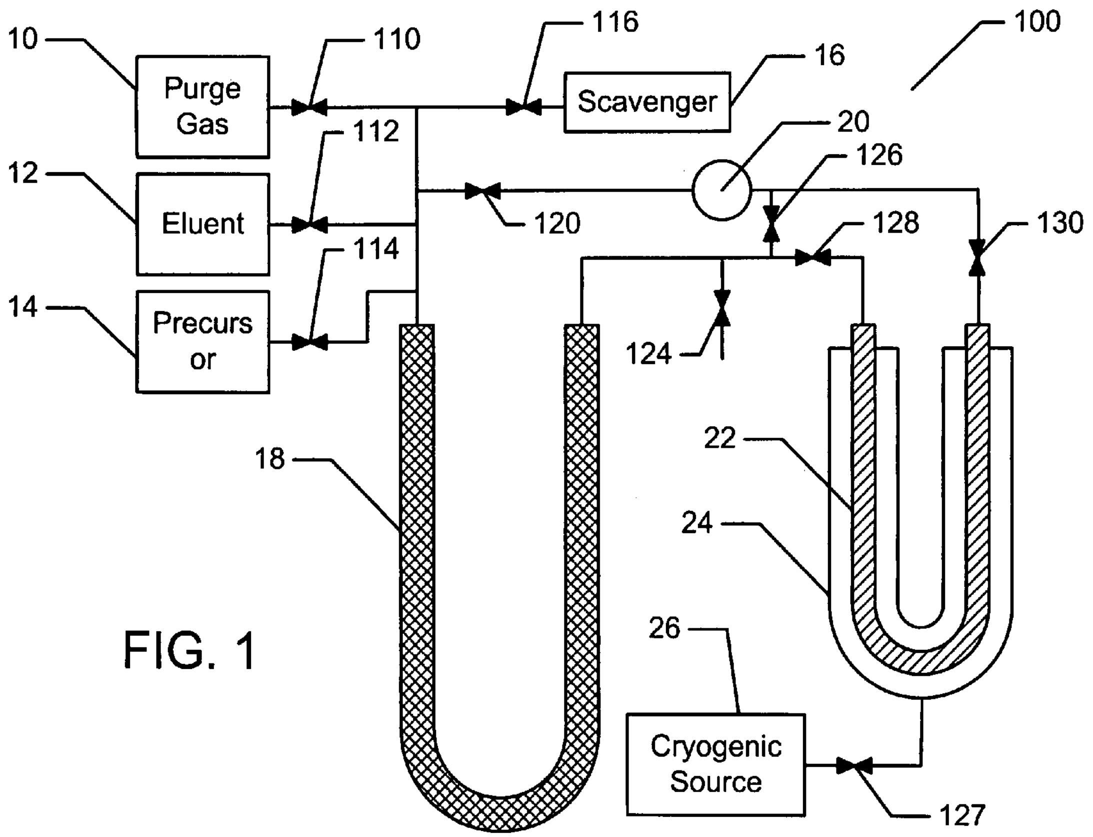
FIG. 1 illustrates a first exemplary embodiment of an apparatus suitable for practicing the method of the present invention.

As illustrated in FIG. 1, a first embodiment of the apparatus 100 includes system having a purge gas source 10, an eluant source 12, a precursor source 14, an oxygen scavenger source 16, a dedicated collection vessel 18, a pump 20, a cold trap vessel 22 surrounded by a cryogenic jacket 24, and a cryogenic liquid source 26 that can be used to supply a cryogenic liquid such as $LN_2$. During a typical generation cycle, valve 110 would be opened to allow a purge gas, preferably an inert gas such as helium, or a sequence of purge gases, such as nitrogen followed by helium, to enter the system and flush the various lines, the collection vessel 18 and the cold trap vessel 22 and remove residual moisture and atmospheric gases or residual gases and/or liquids from a previous generation cycle, after which valve 110 will be closed. In addition to the purging, the system may also be evacuated to remove a substantial portion of the purging gas(es) to ready the system for isotope generation and collection.

Once the system is ready for isotope generation and collection, valve 114 is opened to introduce a quantity of a precursor compound into the system that includes the precursor isotope. In the case of a Ge-68/Ga-68 generator, the preferred precursor compound is germane, $^{68}GeH_4$, although it is expected that other germanium compounds including one or more halogen atoms, e.g., $^{68}GeH_xCl_y$ with x+y=4, may be acceptable alternatives. The precursor compound will preferably be a gas under standard conditions (300 K and 101 kPa) or under any non-standard conditions that will be maintained within the generator during generator operation, will not be subject to significant handling, storage or use restrictions, will not tend to react with the internal surfaces of the system and will be characterized by a boiling point b.p. and/or a melting point m.p. temperature that is above the temperature of the cold trap walls with a relatively low equilibrium vapor pressure. The cold trap may, for instance, be cooled through contact with a cryogenic liquid such as $LN_2$, which has a b.p. of about 77 K (about −196° C.) at 101 kPa.

In addition to the precursor gas, a quantity of an oxygen scavenger compound, e.g., silane ($SiH_4$), may be introduced into the system through valve 116, or may be incorporated into the system as one or more "in-line" cartridges. When injected into and circulated through the generator system, the oxygen scavenger compound will preferably be a gas under standard conditions (300 K and 101 kPa) or under any non-standard conditions that will be maintained within the generator during generator operation, will not be subject to significant handling, storage or use restrictions and will not tend to react with the internal surfaces of the system. In addition, the oxygen scavenger compound is preferably much more reactive with oxygen under the pressure and temperature conditions present in the generator system than the precursor compound. The use of an oxygen scavenger compound is preferred when using $^{68}GeH_4$ as the precursor compound to prevent the slow decomposition of the germane according to reaction (I).

$$^{68}GeH_4+2O_2 \rightarrow {}^{68}GeO_2+2H_2O \quad (I)$$

Preventing or reducing the decomposition of the $^{68}GeH_4$ improves the generator performance by reducing the level of $^{68}Ge$ breakthrough in the desired $^{68}Ga$ product. Without the use of oxygen scavengers, whether introduced as an additional compound in the system or included in an "in-line"

trap, $^{68}GeH_4$ decomposition has been observed at levels as high as 0.05–0.10%. Because the resulting $^{68}GeO_2$ tends to be soluble in the eluants used to recover the desired $^{68}Ga$ product, this level of decomposition may result in unacceptable levels of breakthrough $^{68}Ge$ activity. Although a variety of oxygen scavengers are commercially available in liquid form or as "in-line" traps, including this additional equipment will complicate the generator.

Silane gas, $SiH_4$, is useful as an oxygen scavenger in isotope generators and is widely available as a result of its frequent use in semiconductor manufacturing processes, particularly chemical vapor deposition processes. Silane may be stored for infinite period of time at normal conditions and, unlike germane, silane reacts with oxygen substantially instantaneously. A combination of germane and silane can, therefore, be used to remove trace amount of oxygen trapped in the system by forming silicon dioxide and water according to equation (II) and thereby reduce the $^{68}Ge$ breakthrough.

$$SiH_4+2O_2 \rightarrow SiO_2+2H_2O \qquad (II)$$

Once both the precursor compound and, if used, an oxygen scavenger compound and/or an inert gas, have been charged into the generator system valves 114 and, if opened, 116, 110 are closed. The system charge is then circulated through the generator system, typically through the use of one or more pumps 20 so that the precursor passes through the collector vessel 18 and, optionally, depending on the setting of the system valves 126, 128, the cold trap vessel 22. The collector vessel 18 may be provided with a packing material such as fibers or beads to increase the effective deposition area, but the size and volume of any such packing is preferably selected so as to avoid a significant pressure drop across the collector vessel. If packing materials are incorporated, their surfaces may also be activated to increase the deposition. For example, glass wool or spheres may be lightly etched with a solution of hydrofluoric acid.

The generator is then operated in this generation mode for a period sufficient to allow the desired quantity of the compound comprising the precursor or parent radioisotope to decay and thereby produce the desired secondary or daughter isotope that is, in turn, deposited on surfaces within the system, particularly within the collector vessel 18. As will be appreciated, the duration of the generation mode operation necessary to allow for recovery of the desired quantity of the daughter isotope will be dependent on the particular parent isotope present in the precursor compound, the molar volume of the system charge, the collection surface area, the desired quantity and decay characteristics of the daughter isotope, and the recovery efficiency.

Once a sufficient quantity of the daughter isotope is present within the generator system, the cold trap vessel 22 may be activated by chilling the cold trap walls by introducing a cryogenic liquid, such as $LN_2$, into the cryogenic jacket, placing the cold trap 22 into a vessel containing a cryogenic liquid (not shown), or, if the walls of the cold trap are already chilled, by opening valve 128 to allow the generator system charge to flow through the cold trap vessel 22. As discussed above, the precursor compound is selected so that it will liquefy or solidify substantially completely under the conditions established within the cold trap 22 and thereby be removed from the remainder of the generator system and held within the cold trap.

Once substantially all of the precursor compound is trapped within the cold trap vessel 22, the remainder of the generator system may be purged and/or evacuated to remove additional minor quantities of the precursor compound and prepare the system for recovery operation. By removing the remaining gas phase precursor, the potential for precursor breakthrough in the desired product is reduced, improving the quality of the recovered product. The cold trap vessel 22 and pump 20 may then be isolated from the collection vessel 18 by closing valves 120, 126 and 128.

A volume of an eluant may then be introduced from an eluant supply 12 into the generator system through valve 112 and directed through the collection vessel 18. The eluant selected will include one or more compounds that can remove the deposited daughter isotope compound from the surfaces on which it has collected and wash it from the generator through valve 124. The eluant may be directed through the collector vessel in a single pass or, if desired, may be circulated through the system to remove the daughter isotope compound from internal surfaces of the system other than the collector vessel 18 for a period before being removed through valve 124. This eluant circulation and discharge operation may also be repeated if desired.

Depending on the nature of the daughter isotope compound, the eluant solution utilized and the intended use for the daughter isotope, the eluate may then be subjected to additional neutralization, concentration, purification or isolation processes to obtain the desired product. Typically after substantially all of the daughter isotope compound has been removed in the eluate, the introduction of eluant is stopped by closing valve 112 and the system is purged and dried with a purge gas or gases introduced through valve 110.

Figure 2:
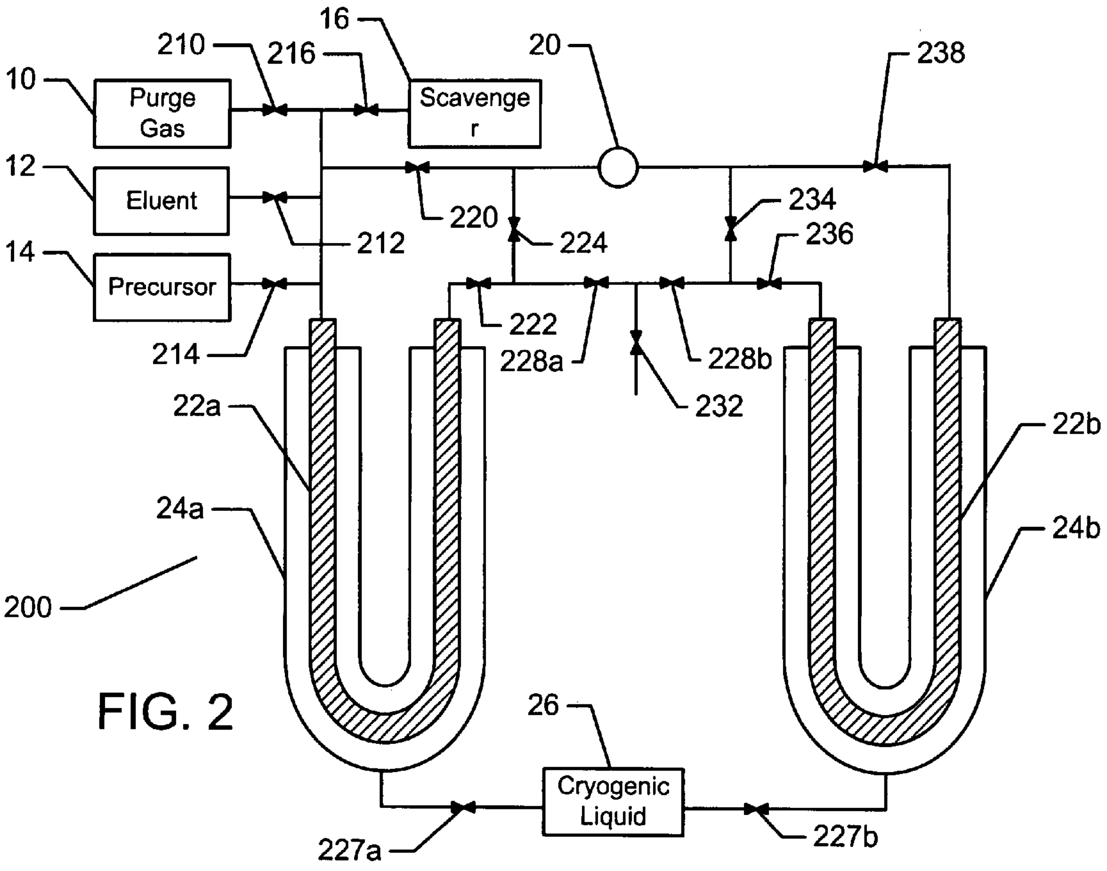
FIG. 2 illustrates a second exemplary embodiment of an apparatus suitable for practicing the method of the present invention.

A second exemplary embodiment of an apparatus suitable for practicing isotope generation according to the present invention is illustrated in FIG. 2. As shown in FIG. 2, this exemplary apparatus is a variation of the apparatus of FIG. 1 in which the collector vessel 18 has been replaced by a second cold trap vessel 22*a*. The apparatus of FIG. 2 allows the cold trap vessels 22*a*, 22*b* to be alternatively used as collection/recovery vessels and as cold traps by alternating the temperature of the cold trap walls. For example, as described above in connection with FIG. 1, the generator system may be dried and purged using one or more purge gases from purge gas source 10, and then charged with a precursor compound from isotope source 14 and, optionally an oxygen scavenger from source 16 and/or an inert gas from source 10.

As with the collector described in FIG. 1, the cold traps may be provided with a packing material such as fibers or beads to increase the effective deposition area with the size and volume of any such packing preferably selected so as to avoid a significant pressure drop across the cold trap. If packing materials are incorporated, their surfaces may also be activated to increase the deposition. For example, glass wool or spheres may be lightly etched with a solution of hydrofluoric acid.

This system charge may then be circulated through the system including vessels 22*a* and/or 22*b* for a period of time sufficient to deposit a quantity of the secondary compound on the internal system surfaces. The cold trap vessel that will not be used for recovery, in this instance 22*b*, will then be used will be chilled through use of a cryogenic liquid from source 26 to trap substantially all of the remaining precursor compound, and the cold trap vessel being used for recovery, in this instance 22*a*, can then be flushed with an eluant solution from source 12 to recover the secondary compound, with or without an additional purging or evacuation step to remove residual quantities of the precursor compound prior to recovery. Once the recovery has been completed, the eluted portions of the system may be purged and dried, and the temperature of the cold trap increased, thereby allowing the trapped charge to vaporize and begin a new generation cycle. By alternating the operation of the cold trap vessels 22*a*, 22*b* between collection/recovery and cold-trapping modes, the apparatus as illustrated in FIG. 2 can increase the production of the desired daughter isotope over that which can be achieved using an apparatus according to the apparatus of FIG. 1.

Figure 3:
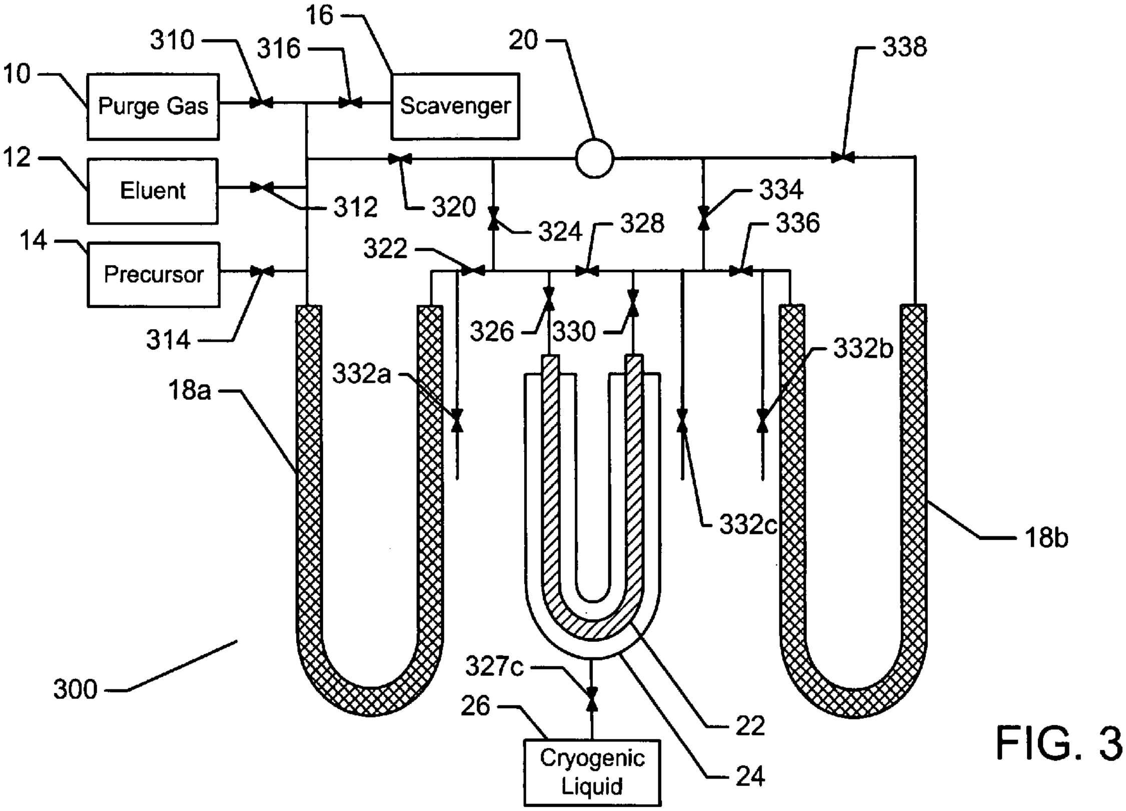
FIG. 3 illustrates a third exemplary embodiment of an apparatus suitable for practicing the method of the present invention.

A third exemplary embodiment of an apparatus suitable for practicing isotope generation according to the present invention is illustrated in FIG. 3. As shown in FIG. 3, this exemplary apparatus a variation of the apparatus of FIG. 1 in which includes two dedicated collector vessels 18*a*, 18*b* that are both operatively connected to the cold trap vessel 22. The apparatus of FIG. 3 allows the collection vessels 18*a*, 18*b* to be alternatively used as collection/recovery vessels while using the cold trap vessel 22 to support both collection vessels. For example, as described above in connection with FIGS. 1 and 2, the generator system may be dried and purged using one or more purge gases from purge gas source 10, and then charged with a precursor compound from isotope source 14 and, optionally an oxygen scavenger from source 16 and/or an inert gas from source 10.

This system charge may then be circulated through the system including collection vessels 18*a*, 18*b* and/or 22 for a period of time sufficient to deposit a quantity of the secondary compound on the internal system surfaces. After sufficient generation time, the cold trap vessel 22 will be chilled through use of a cryogenic liquid from source 26 and used to trap substantially all of the remaining precursor compound and then isolated from the collection vessel(s) 18*a*, 18*b* from which the secondary compound will be recovered. The collection vessel, typically 18*a* or 18*b*, can then be flushed with an eluant solution from source 12 to recover the secondary compound, with or without an additional purging or evacuation step to remove residual quantities of the precursor compound before recovery. Once the recovery has been completed, the eluted portions of the system may be purged and dried, the valve positioning reset, and the temperature of the cold trap increased, thereby allowing the trapped charge to vaporize and begin a new generation cycle. By alternating the use of the collection vessels 18*a*, 18*b* between collection/recovery and purging/drying modes through selective operation of the valves 310–338, the apparatus as illustrated in FIG. 3 may increase the production of the desired daughter isotope over that which can be achieved using an apparatus corresponding to the apparatus of FIG. 1.

Figure 4:
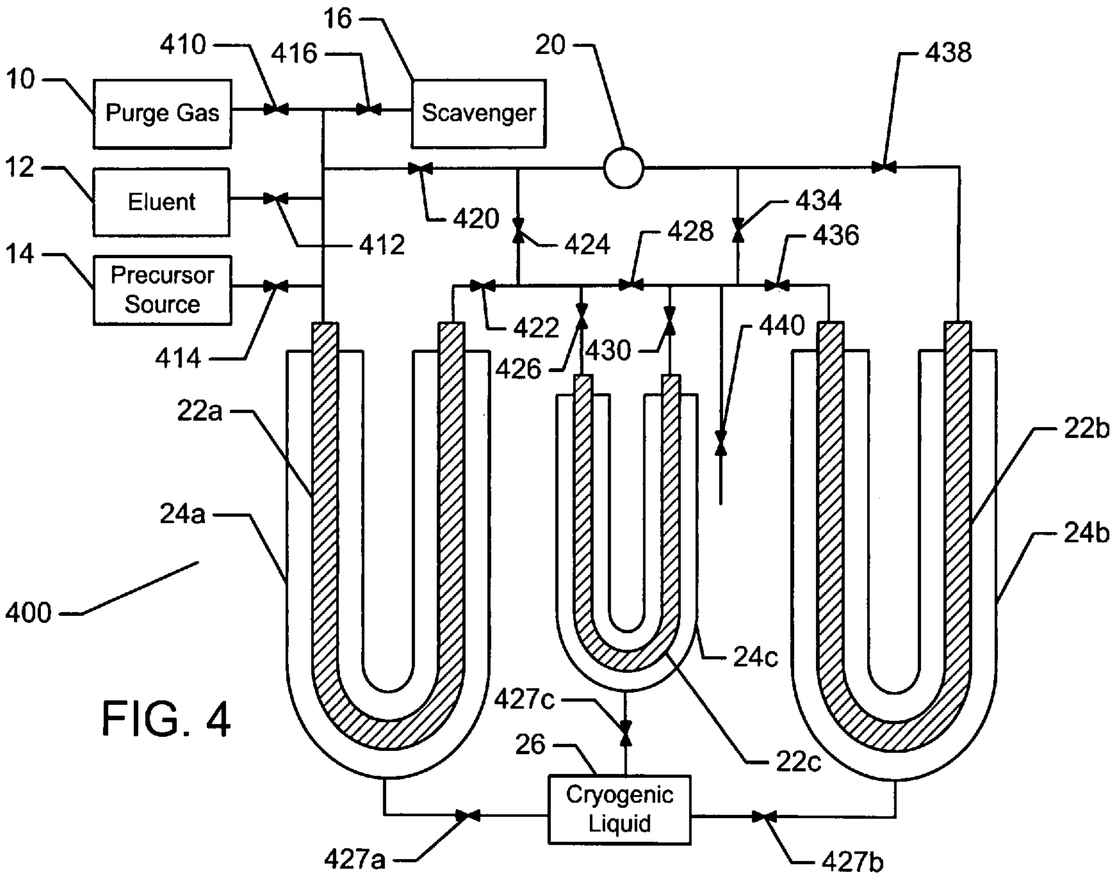
FIG. 4 illustrates a fourth exemplary embodiment of an apparatus suitable for practicing the method of the present invention.

A fourth exemplary embodiment of an apparatus suitable for practicing isotope generation according to the present invention is illustrated in FIG. 4. As shown in FIG. 3, this exemplary apparatus a variation of the apparatus of FIG. 3 in which the two dedicated collector vessels 18*a*, 18*b* have been replaced by cold trap vessels 22*a*, 22*b*. The apparatus of FIG. 4 allows the cold trap vessels 22*a*, 22*b* to be alternatively used as collection/recovery vessels as generally described in connection with FIG. 2 while providing a third cold trap vessel 22*c* that may be used to support cold trap vessels 22*a*, 22*b* and improve recovery of the residual precursor vapor during a purge step before introduction of the eluent to initiate the recovery step. For example, as described above in connection with FIGS. 1–3, the generator system may be dried and purged using one or more purge gases from purge gas source 10, and then charged with a precursor compound from isotope source 14 and, optionally an oxygen scavenger from source 16 and/or an inert gas from source 10.

This system charge may then be circulated through the system including cold trap vessels 22*a*, 22*c* and/or 22 for a period of time sufficient to deposit a quantity of the secondary compound on the internal system surfaces. After sufficient generation time, the cold trap vessel not being used for recovery, in this instance 22*b*, may be chilled through use of a cryogenic liquid from source 26 and used to trap substantially all of the remaining precursor compound and then isolated from the remainder of the system.

The residual precursor compound in the cold trap vessel being used for recovery, in this instance 22*a*, can then be purged with an inert gas though cold trap 22*c*, thereby removing substantially all of the residual precursor compound and improving the recovery of this frequently expensive compound. The cold trap vessel 22*a* can then be flushed with an eluant solution from source 12 to recover the secondary compound. Once the recovery has been completed, the eluted portions of the system may be purged and dried, the valve positioning reset, and the temperature of the cold trap increased, thereby allowing the trapped charge to vaporize and begin a new generation cycle. By alternating the use of the cold trap vessels 22*a*, 22*b* between collection/recovery and trapping modes through selective operation of the valves 410–440, the apparatus as illustrated in FIG. 4 may increase the production of the desired daughter isotope over that which can be achieved using an apparatus corresponding more closely to the apparatus illustrated in FIGS. 1 and 2.

An apparatus generally corresponding to the apparatus of FIG. 4 was constructed using primary cold trap vessels generally corresponding to vessels 22*a*, 22*b*. Although illustrated as U-shaped traps for simplicity, it will be appreciated that the channel within the cold traps may assume a variety of configurations, preferably configurations that will increase the heat transfer surface and provide a sufficient storage volume to contain the entire precursor compound charge in a liquid or solid state. Similarly, it will be appreciated that the cold traps will preferably be constructed from a material that tolerates thermal shock, provides adequate heat conduction and will not tend to react with any of the compounds that will be used in the generator system. In addition to the primary cold traps, a secondary cold trap corresponding generally to 22*c* to provide additional removal of the precursor compound during the pre-recovery purge and/or as an alternate to the primary cold traps if needed.

The generator system was then charged with mixture of helium and approximately 2 $cm^3$ of $^{68}$Ge labeled $GeH_4$ and operated in a collection mode with the charge being held in a first cold trap for a period of time sufficient to form a target quantity of $^{68}$Ga. The second cold trap was then activated by immersing the cold trap in $LN_2$ as the charge was cycled through the second cold trap to collect substantially all, preferably at least about 99.9%, within about 5 minutes, of the remaining $^{68}GeH_4$. As a result of the equilibrium vapor pressure and the system volume, however, less than about 0.1% of the remaining $^{68}$ $GeH_4$ may not be captured in the cold trap. The exact fraction of the precursor not confined within the cold trap will typically be a function of at least the precursor compound properties, the charge volume, the length of the trapping cycle, the trapping geometry and the trapping temperature.

This residual precursor may be removed can be removed from the gas phase by purging the first cold trap with purge gas such as He through the secondary trap which has been activated by immersion in $LN_2$. As with the effectiveness of the primary cold trapping, the exact fraction of the remaining precursor that can be removed from the first cold trap will typically be a function of at least the precursor compound properties, the purge gas, the purge gas flowrate and the length of the purge cycle.

The $^{68}$Ga deposited on the walls of the first cold trap can then be recovered by washing the cold trap with an eluent such as solutions including, for example, an hydrochloric acid solution having an acidic pH or other suitable solution (s). Of course, depending on the particular isotope being recovered and the intended use of the recovered isotope, other eluents may be suitable or even preferred including, for example, solutions containing one or more compounds selected from a group consisting of hydrochloric acid, nitric acid, hydrogen peroxide, hydrazine dihydrochloride, hydrofluoric acid and sodium chloride and/or including one or more chelating agents including, for example, diethylenetriamine pentaacetic acid (DTPA), 1,4,7,10-tetraazacyclododecane N, N', N'', N''' tetraacetic acid (DOTA) or ethylenediamine tetraacetic acid (EDTA).

After the elution step has been completed, the cold trap and the lines through which the eluent was passed are preferably dried with a purge gas such as He or Ar. This procedure can then be substantially reversed to use the second primary cold trap for the collection/recovery of the secondary isotope while the first primary cold trap is activated by immersion or otherwise exposed to a cryogenic liquid to trap the precursor compound.

An initial series of tests resulted in an observed accumulation of non-gaseous $^{68}$Ge activity in the recovered $^{68}$Ga product, that was attributed to the formation of $^{68}GeO_2$ by reaction of the $^{68}GeH_4$ with residual oxygen. In an effort to reduce the $^{68}$Ge breakthrough, silane $SiH_4$, was added to the system charge as an oxygen scavenger. Silane has a structure generally analogous to germane and exhibits similar physical properties (m.p. −185° C., b.p. −112° C.) and can, therefore, be transferred between the traps along with the precursor $^{68}GeH_4$. This ability to trap and vaporize the oxygen scavenger and the precursor compound effectively at the same temperature (using $LN_2$ to activate the cold traps) also reduces the complexity of the system (no cartridge oxygen scavengers required) and reduces the cost by preserving the oxygen scavenger rather than purging it during each recovery cycle.

Using the generator system as detailed above, a $^{68}$Ge/68Ga generator was charged with a mixture of 2μ Ci $^{68}$Ge—$GeH_4$, $SiH_4$(about 2 $cm^3$ of each) and He and operated in the manner described. The radiochemical yield of the generator was better than 90% with $^{68}$Ge breakthrough values measured at less than about 0.001%.

Those of ordinary skill in the art will appreciate that the present invention may be embodied in forms other than those specifically illustrated and described herein without departing from the spirit and essential characteristics of the invention. The exemplary embodiments of the invention described in detail above and illustrated in the accompanying figures are intended to aid in the understanding of the invention but should not be interpreted as unduly limiting the scope of the invention as defined in the appended claims. All changes which come within the meaning and equivalency of the claims are to be embraced.

I claim:

1. A method for generating a secondary isotope from a precursor isotope comprising:

introducing a charge into a generator system, the charge including a volume of a precursor compound that includes the precursor isotope, the generator system having operating conditions selected to maintain the precursor compound as a gas;

maintaining the charge within the generator system for a period sufficient for a quantity of the precursor compound to decay and produce a target quantity of a secondary compound that includes the secondary isotope;

collecting the secondary compound as a solid on a collection surface within the generator system;

trapping a volume of the precursor compound in a cold trap arranged within the generator system, the cold trap being remote and separable from the collection surface and having operating conditions under which the precursor compound is a liquid or a solid;

eluating the collection surface with an eluant solution to remove a major portion of the secondary compound from the collection surface and form an eluate containing substantially all of the secondary compound;

removing the eluate from the generator system.

2. A method for generating a secondary isotope from a precursor isotope according to claim 1, wherein:

the charge further includes a volume of an oxygen scavenger.

3. A method for generating a secondary isotope from a precursor isotope according to claim 2, wherein:

the charge further includes a volume of an inert diluent.

4. A method for generating a secondary isotope from a precursor isotope according to claim 3, wherein:

the precursor compound is germane that is radiolabeled with $^{68}$Ge;

the oxygen scavenger is silane;

the inert diluent includes a compound selected from helium, neon, argon, krypton and xenon; and the eluant is an aqueous solution of hydrochloric acid.

5. A method for generating a secondary isotope from a precursor isotope according to claim 3, further comprising:

purging the collection surface with an inert gas before introducing the charge into the generator system; and purging the collection surface with an inert gas after collecting the secondary compound on the collection surface and trapping the volume of the precursor compound, but before eluating the collection surface.

6. A method for generating a secondary isotope from a precursor isotope according to claim 5, further comprising:

purging the collection surface with an inert gas after the step of eluating the collection surface.

7. A method for generating a secondary isotope from a precursor isotope according to claim 3, wherein:

trapping a volume of the precursor compound in the cold trap includes;

exposing external surfaces of the cold trap to a cryogenic fluid while passing the charge through the cold trap for a period sufficient to convert substantially all of the precursor compound present in the generator system to a liquid or a solid state.

8. A method for generating a secondary isotope from a precursor isotope according to claim 7, wherein:

substantially all of the oxygen scavenger present in the generator system is converted to a liquid or a solid within the cold trap.

9. A method for generating a secondary isotope from a precursor isotope according to claim 8, wherein:

the cryogenic fluid is liquid nitrogen.

10. A method for generating a secondary isotope from a precursor isotope according to claim 6, further comprising:

after purging the collection surface with an inert gas, modifying the operating conditions of the cold trap to vaporize the trapped precursor compound from the cold trap and thereby recharge the generator system.

11. A method for generating $^{68}Ga$ from a $^{68}Ge$ precursor compound:

introducing a charge into a generator system, the charge including a volume of $^{68}Ge$ labeled $GeH_4$ as the precursor compound;

maintaining the charge within the generator system for a period sufficient for a quantity of the $^{68}Ge$ labeled $GeH_4$ to decay and produce a target quantity of a secondary compound that includes $^{68}Ga$;

collecting the secondary compound on a collection surface within the generator system;

trapping a volume of the $^{68}Ge$ labeled $GeH_4$ in a cold trap arranged within the generator system, the cold trap being remote and separable from the collection surface;

eluating the collection surface with an eluant solution to remove a major portion of the secondary compound from the collection surface and form an eluate including $^{68}Ga$;

removing the eluate from the generator system.

12. A method for generating 68Ga from a $^{68}Ge$ precursor compound according to claim 11:

the charge further includes a volume of silane as an oxygen scavenger.

13. A method for generating $^{68}Ga$ from a $^{68}Ge$ precursor compound according to claim 12, wherein:

the charge further includes a volume of a diluent gas including one gas selected from a group consisting of hydrogen, helium, nitrogen, neon, argon, krypton and xenon.

14. A method for generating $^{68}Ga$ from a $^{68}Ge$ precursor compound according to claim 13, wherein:

the eluant solution is an aqueous solution of hydrochloric acid; and the eluate includes substantially all of the $^{68}Ga$ that was present in the collector vessel prior to the step of eluating and exhibits a $^{68}Ge$ breakthrough of less than 0.001%.

15. A method for generating 68Ga from a $^{68}Ge$ precursor compound according to claim 13, further comprising:

purging the collection surface with an inert gas before introducing the charge into the generator system; and purging the collection surface with an inert gas after collecting the secondary compound on the collection surface and trapping the volume of the $^{68}Ge$ labeled $GeH_4$, but before eluating the collection surface.

16. A method for generating $^{68}Ga$ from a $^{68}Ge$ precursor compound according to claim 15, further comprising:

purging the collection surface with an inert gas after the step of eluating the collection surface.

17. A method for generating 68Ga from a $^{68}Ge$ precursor compound according to claim 13, wherein:

trapping the volume of the $^{68}Ge$ labeled $GeH_4$ in the cold trap includes;

exposing external surfaces of the cold trap to a cryogenic fluid while passing the charge through the cold trap for a period sufficient to convert substantially all of the $^{68}Ge$ labeled $GeH_4$ present in the generator system to a liquid or a solid state.

18. A method for generating $^{68}Ga$ from a $^{68}Ge$ precursor compound according to claim 17, wherein:

substantially all of the silane scavenger present in the generator system is trapped in the cold trap with the volume of the $^{68}Ge$ labeled $GeH_4$.

19. A method for generating $^{68}Ga$ from a $^{68}Ge$ precursor compound according to claim 18, wherein:

the cryogenic fluid is liquid nitrogen.

20. A method for generating $^{68}Ga$ from a $^{68}Ge$ precursor compound according to claim 16, further comprising:

after purging the collection surface with an inert gas, modifying the operating conditions of the cold trap to vaporize the trapped $^{68}Ge$ labeled $GeH_4$ from the cold trap and thereby recharge the generator system.

21. An apparatus for generating a secondary compound including an daughter isotope resulting from the decay of a parent isotope included in a charge of a precursor compound comprising:

a generator system for receiving the charge of the precursor compound including a collector vessel, the collector vessel including a collection surface for the collection of the secondary compound, a cold trap, the cold trap including an external surface arranged and configured to be selectively exposed to a cryogenic liquid, a pump, lines connecting the collector vessel, the cold trap and pump, and valves for controlling the flow of fluid through the generator system; and a precursor compound source operatively connected to the generator system;

a purge gas source operatively connected to the generator system;

an oxygen scavenger compound source operatively connected to the generator system;

an eluant source operatively connected to the generator system; and an eluate outlet operatively connected to the generator system.

22. An apparatus for generating a secondary compound including an daughter isotope according to claim 21, wherein:

the collector vessel may be selectively operated as a second cold trap and including an external surface arranged and configured to be selectively exposed to a cryogenic liquid; and the cold trap may be selectively operated as a second collector vessel, the cold trap including a collection surface for the collection of the secondary compound.

23. An apparatus for generating a secondary compound including an daughter isotope according to claim 22, further comprising:

a recovery cold trap operatively connected to both the collector vessel and the cold trap.

24. An apparatus for generating a secondary compound including an daughter isotope according to claim 21, wherein:

the cold trap encloses a volume sufficient to contain substantially the entire charge of the precursor compound when said precursor compound is in a liquid or a solid state.

25. An apparatus for generating a secondary compound including an daughter isotope according to claim 24, wherein:

the cold trap encloses a volume sufficient to contain both substantially the entire charge of the precursor compound when said precursor compound is in a liquid or a solid state and substantially all of the oxygen scavenger compound present in the generator system when the oxygen scavenger compound is in a liquid or a solid state.

* * * * *